United States Patent [19]
Kutinsky et al.

[11] Patent Number: 5,664,891
[45] Date of Patent: Sep. 9, 1997

[54] DOWNHOLE BEARING ASSEMBLY WHICH ACCOMMODATES COMPRESSIVE AND TENSILE AXIAL

[75] Inventors: David Peter Kutinsky, Edmonton; Raymond Samuel Livingstone, Sherwood Park; Raymond Dean Livingstone, Edmonton, all of Canada

[73] Assignee: Canadian Downhole Drill Systems, Inc., Canada

[21] Appl. No.: 611,094

[22] Filed: Mar. 5, 1996

[51] Int. Cl.⁶ .................................................. F16C 17/04
[52] U.S. Cl. ............................................................ 384/420
[58] Field of Search .................................. 384/420, 302, 384/303, 304, 307

[56] References Cited

U.S. PATENT DOCUMENTS

| | | | |
|---|---|---|---|
| 4,511,193 | 4/1985 | Geczy | 384/611 |
| 4,720,199 | 1/1988 | Geczy et al. | 384/420 |
| 5,150,972 | 9/1992 | Wenzel | 384/97 |
| 5,364,192 | 11/1994 | Damm et al. | 384/304 |

*Primary Examiner*—Lenard A. Footland
*Attorney, Agent, or Firm*—Limbach & Limbach L.L.P.

[57] ABSTRACT

A bearing assembly for bearing tensile and compressive axial loads. In preferred embodiments, the invention is a bearing assembly for use downhole, including a first member and a second member with coinciding central longitudinal axes, and a thrust bearing subassembly in a chamber between the first and second members defined by two shoulders of the first member and two shoulders of the second member. The second member is free to rotate, and has at least limited freedom to translate axially, relative to the first member. The thrust bearing subassembly's overall axial length is such that the first member can translate axially relative to the second member between a first configuration in which the thrust bearing subassembly bears a tensile axial load and a second configuration in which it bears a compressive axial load.

17 Claims, 3 Drawing Sheets

DOWNHOLE BEARING ASSEMBLY WHICH ACCOMMODATES COMPRESSIVE AND TENSILE AXIAL

FIELD OF THE INVENTION

The invention is a bearing assembly for use in a downhole environment for bearing axial tensile and axial compressive loads. The inventive bearing assembly can be installed as a bearing section of a downhole tool for drilling, for example, a tool including a drill bit and a mud motor.

BACKGROUND OF THE INVENTION

The invention is bearing assembly useful in tools for deployment in wells (i.e., in a downhole environment). One such tool is a drilling assembly including a mud motor power section (e.g., a positive displacement motor or "PDM"), a drill bit assembly, and a bearing section connected between the drill bit assembly and the power section. A PDM is a pump through which fluid (e.g., drilling mud, water, or air) is pumped to rotate an internal rotor within a stator housing. The rotor typically undergoes eccentric motion within the stator housing, and thus a universal joint is usually coupled between the rotor and the bearing section. In response to the eccentrically rotating rotor, the universal joint causes a portion of the bearing section to rotate concentrically within a housing (typically, a stationary tubular member). The drill bit rotates as a unit with the rotating portion of the bearing section.

The bearing section is attached between the drill bit and the PDM along the longitudinal axis of the tool, and the tool is disposed in a well whose central longitudinal axis is substantially parallel to the tool's longitudinal axis. It is desirable that the bearing section accommodate three types of loads: radial loads exerted (perpendicular to the tool's longitudinal axis) between the bearing section's inner rotating portion and the bearing section's outer non-rotating portion; tensile axial loads (equivalent to a force in the uphole direction on the outer non-rotating portion with a force in the downhole direction on the inner rotating portion); and compressive axial loads (equivalent to a force in the downhole direction on the outer non-rotating portion with a force in the uphole direction on the inner rotating portion). The bearing section experiences tensile axial loads, for example, when the tool is off the bottom of the well but the inner rotating section translates downhole toward the bottom of the well. The bearing section experiences compressive axial loads when the drill bit rests on the bottom of the well and rotates against the subterranean formation in response to rotation of the bearing section's inner rotating portion.

In one type of conventional bearing assembly for use in a downhole environment, two axially separated thrust bearings are used: one to accommodate tensile axial loads; the other to accommodate compressive axial loads. However, such a bearing assembly has a long overall length, which limits the curvature of a hole that can be drilled using it (in a directional drilling operation). In order to drill a hole having a short radius of curvature, it is necessary to use a drilling tool having a shorter overall length than can be achieved using a bearing assembly including two such axially separated thrust bearings.

Another type of conventional bearing assembly for use in a downhole environment is described in U.S. Pat. No. 4,511,193, issued Apr. 16, 1985. The bearing assembly of U.S. Pat. No. 4,511,193 includes two bearing sets (84 and 86), each including ball bearings 87 in a race defined by four race elements 88, 100, 110, and 118. Each of race elements 100 and 118 has grooves and lands which lock it to an inner rotatable member (so that elements 100 and 118 rotate as a unit with inner tubular member 26). Each of race elements 88 and 110 has grooves and lands which lock it to an outer stationary member (so that elements 88 and 110 remain stationary with outer stationary tubular member 12, even while member 26 rotates relative to member 12). Each of the ball bearings 87 bears radial, axial tensile, and axial compressive loads. The bearing assembly of U.S. Pat. No. 4,511,193 includes Bellville springs 160, 162, 164, 166, 168, and 170 which maintain an axial preload on bearings 87. Thus, the bearing assembly of U.S. Pat. No. 4,511,193 has a complicated design requiring race elements specially designed to have curved surfaces and to be locked with other components of the assembly, and also requiring axial pre-loading springs for applying preloading force to ball bearings.

U.S. Pat. No. 5,150,972, issued Sep. 29, 1992, discloses another type of bearing assembly for use downhole, for enabling relative rotation of inner tubular member 14 which is telescopically received in outer tubular member 12 (and including one or more thrust bearings 18 each of which bears axial tensile and axial compressive loads). In the bearing assembly of U.S. Pat. No. 5,150,972, outer tubular member 12 has opposed parallel shoulders 20 and 22, and inner tubular member 14 has opposed parallel shoulders 26 and 28. Shoulders 20, 22, 26, and 28 define a containment chamber. At least one thrust bearing 18 is disposed in the containment chamber such that, when the assembly is placed in compression, shoulder 20 on member 12 bears against a first race of thrust bearing 18 (through spacer 38) and shoulder 28 on member 14 bears against a second race of thrust bearing 18 (through spacer 40). When the assembly is placed in tension, shoulder 22 on member 12 bears against the second race (by bearing on spacer 40) and shoulder 26 on member 14 bears against the first race (through spacer 38). The bearing assembly of U.S. Pat. No. 5,150,972 also includes biasing springs 42 in the containment chamber for maintaining an axial preload on thrust bearing 18.

When the bearing assembly of U.S. Pat. No. 5,150,972 is placed in tension (when running off the bottom of a well), member 14, shoulder 26, spacer 38, and thrust bearing 18 (including race element 34) rotate together as a unit about a longitudinal axis (the horizontal axis of FIGS. 1 and 2 of U.S. Pat. No. 5,150,972) relative to stationary member 12 (including shoulder 22) and spacer 40 which also remains stationary. Because shoulders 20 and 26 and spacer 38 all have load bearing surfaces oriented perpendicular to the longitudinal axis, one or both of elements 38 and 18 will slide transversely against member 12, and/or spacer 40 will slide transversely against member 14, and the frictional force between member 12 and rotating spacer 38 (and/or bearing 18) and/or the frictional force between spacer 40 and member 14 causes substantial heat build up, and ultimately bearing failure. Similarly, when the bearing assembly of U.S. Pat. No. 5,150,972 is placed under axial compression (when running on the bottom of a well), member 14 (including shoulder 28), spacer 40, and thrust bearing 18 (including race element 36) rotate together as a unit about the longitudinal axis relative to stationary member 12 (including shoulder 20) and spacer 38 which remains stationary. Because shoulders 20 and 26 and spacer 38 all have load bearing surfaces oriented perpendicular to the longitudinal axis, one or both of elements 40 and 18 will slide transversely against member 12, and/or spacer 38 will slide transversely against member 14, and the frictional force between member 12 and rotating spacer 40 (and/or bearing 18) and/or the frictional force between spacer 38 and member 14 causes substantial heat build up, and ultimately bearing failure. Thus, the bearing assembly of U.S. Pat. No. 5,150,972 has a design which subjects it to substantial frictional force (and thus heat build up and wear) during operation.

It had not been known until the present invention how to design a downhole bearing apparatus in a manner overcoming the noted disadvantages and limitations of conventional apparatus.

SUMMARY OF THE INVENTION

The invention is a bearing assembly capable of bearing both tensile and compressive axial loads. In a preferred embodiment, the invention is a bearing assembly for use in a downhole environment, including: a first member having a central longitudinal axis; a second member having a second central longitudinal axis that coincides with the central longitudinal axis, the second member having freedom to rotate about the central longitudinal axis relative to the first member and at least limited freedom to translate axially (along the central longitudinal axis) relative to the first member; and a thrust bearing subassembly within a chamber between the first member and the second member defined by two shoulders of the first member and two shoulders of the second member (and a portion of the first member between the shoulders thereof and a portion of the second member between the shoulders thereof). The overall axial length of the thrust bearing subassembly is such that the first member is free to translate axially (along the longitudinal axis) relative to the second member between a tensile load configuration (in which the thrust bearing subassembly bears a tensile axial load) and a compressive load configuration (in which the thrust bearing subassembly bears a compressive axial load).

The thrust bearing subassembly includes a pair of side members and a thrust bearing between the side members (or multiple pairs of side members, each having a thrust bearing therebetween). Each side member has a flat end face (abutting a thrust bearing) and an angled end surface (opposite the flat end face). A central portion of each angled end surface is an extreme distance away from the flat end face (i.e., the central portion is either the part of the angled end surface nearest to or farthest from the flat end face). Each angled end surface also has two outer surface portions which meet each other at an angle (an acute or obtuse angle). Each of the outer surface portions of each angled end surface of each side member faces a shoulder (one of the shoulders of the first member or the second member), and each shoulder has a profile which matches that of the outer surface portion facing it. Thus, each shoulder efficiently bears against one outer surface portion in either the tensile or compressive load configuration, but is held off that outer surface portion in the other one of the tensile and compressive load configurations, and the entire bearing subassembly is centered transversely in the chamber (in the sense that there is no more than insignificant friction between either side member and the portion of the chamber wall between the shoulders of the first member or the portion of the chamber wall between the shoulders of the second member).

In preferred embodiments, the central portion of each side member is the portion of the angled end surface which is farthest from the flat end face, and the two outer surface portions meet at an acute angle at the central portion (such a side member has greatest thickness at the central portion, and is sometimes denoted herein as a "protruding" side member). In alternative embodiments, the central portion of at least one side member is the portion of the angled end surface nearest to the flat end face, and the two outer surface portions meet at an obtuse angle at the central portion (such a side member is sometimes denoted herein as an "indented" side member). In the preferred embodiments, each longitudinal end of the chamber is defined by shoulders which meet at an obtuse angle (each shoulder having a profile which matches that of the outer surface portion facing it). In the alternative embodiments, each longitudinal end of the chamber which faces an indented side member is defined by shoulders which meet at an acute angle (each shoulder having a profile which matches that of the outer surface portion facing it).

The thrust bearing subassembly preferably includes two rings and a generally ring-shaped thrust bearing between the rings. Preferably, each ring has an annular flat end surface, and an angled end surface having a central portion which is a circular ridge and two outer surface portions which meet at the circular ridge. Each outer surface portion has the shape of part of the surface of a solid cone (i.e., a section between two parallel circles on the surface of the solid cone).

Also preferably, the invention includes a spring assembly for preloading one of the shoulders of the first member against the other shoulder of the first member. Such spring assembly preferably exerts no force on the thrust bearing subassembly in the tensile load configuration, but functions to absorb shocks and vibrational energy that would otherwise be absorbed by the thrust bearing subassembly when the inventive apparatus is in the compressive load configuration.

DETAILED DESCRIPTION OF THE PREFERRED EMBODIMENT

Figure 1:
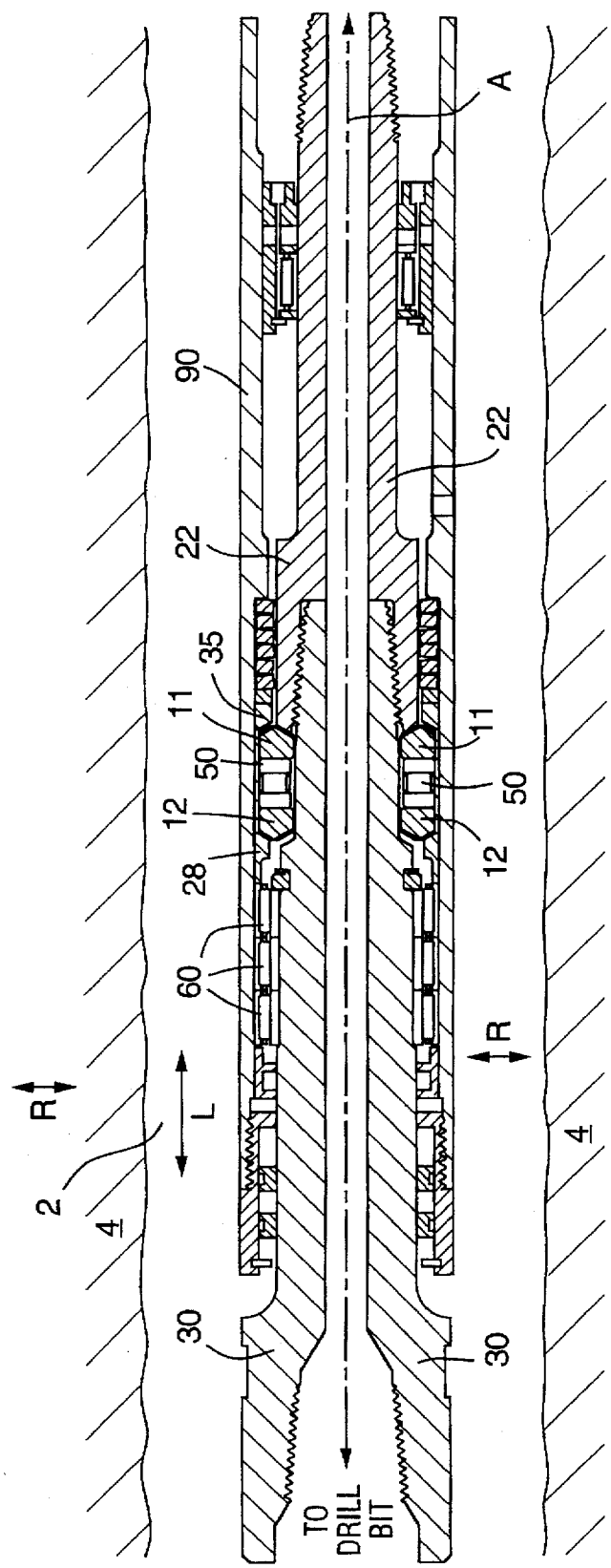
FIG. 1 is a side cross-sectional view of a preferred embodiment of the inventive bearing assembly, in a well.

A preferred embodiment of the invention will be described with reference to FIGS. 1–3. This embodiment is the bearing assembly shown in FIG. 1, which is disposed in fluid-containing well 2 extending through subterranean earth formation 4. The bearing assembly shown in FIG. 1 is intended for installation as a bearing section of a larger tool (not shown in FIG. 1) for use in a downhole environment (e.g., in well 2), and thus each element of the FIG. 1 assembly has sufficient strength for such use in a downhole environment.

A typical example of such tool is a drilling tool including a drill bit and a mud motor power section. The drill bit (not shown in FIG. 1) would be connected directly (or through other components) to the left end of mandrel 30 of FIG. 1. The mud motor power section is also not shown in FIG. 1 but would be connected, usually through other components (typically including a universal joint of the type discussed below), to the right end of washpipe 22 and the right end of tubular member 90 at a location off to the right of FIG. 1 (i.e., uphole relative to the bearing assembly of FIG. 1). The power section can be of any of several well known types, such as a positive displacement motor (PDM). As noted above, a PDM includes an internal rotor which rotates within a stator housing as fluid is pumped through the PDM. As also noted above, a universal joint is usually coupled between the rotor and a bearing section (e.g., the bearing assembly of FIG. 1, including stationary tubular member 90 which surrounds and houses all other elements of the FIG. 1 apparatus except the left end of mandrel 30). In response to eccentric rotation of the rotor, the universal joint causes the bearing section to rotate, and the bearing section rotates concentrically within its housing (e.g., within stationary tubular member 90).

Figure 2:
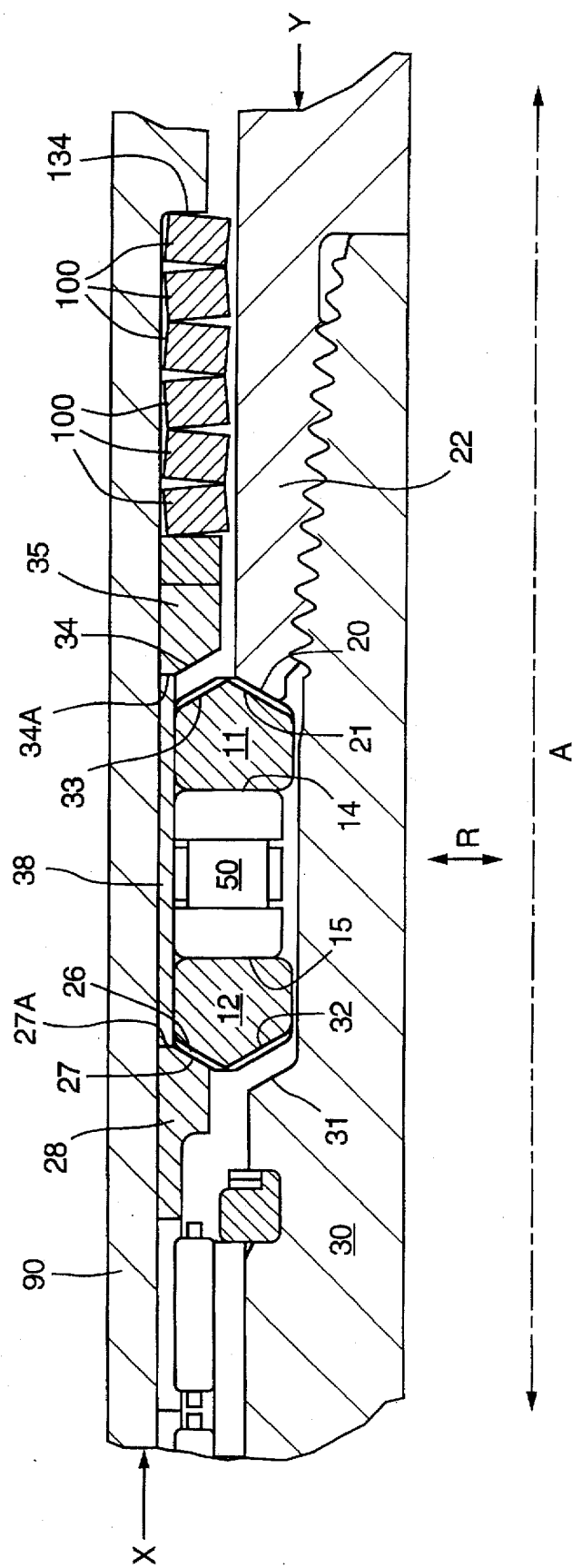
FIG. 2 is a side cross-sectional view of a portion of the FIG. 1 apparatus, in a configuration in which it bears a tensile axial load (equivalent to force X in the uphole direction on member 90 and force Y in the downhole direction on washpipe member 22).

The bearing section is attached between the drill bit and the PDM along the central longitudinal axis of the tool (axis A shown in FIGS. 1 and 2, which coincides with both the central longitudinal axis of portion 90 of the bearing section and the central longitudinal axis of assembled members 20 and 33 of the bearing assembly). The longitudinal axis of the tool is typically substantially parallel to the longitudinal axis L (shown in FIG. 1) of the well in which the tool is disposed. It should be understood that the FIG. 1 apparatus has (and typical tools in which it can be installed would have) rotational symmetry about central longitudinal axis A. Thus, FIG. 2 (and FIG. 3) shows only half (the half above axis A in FIG. 1) of one axial section (the length including bearing 50) of the bearing assembly of FIG. 1, and the other half of such axial section (not shown in FIG. 2) is a mirror image (below axis A in FIG. 2) of the half shown in FIG. 2.

Figure 3:
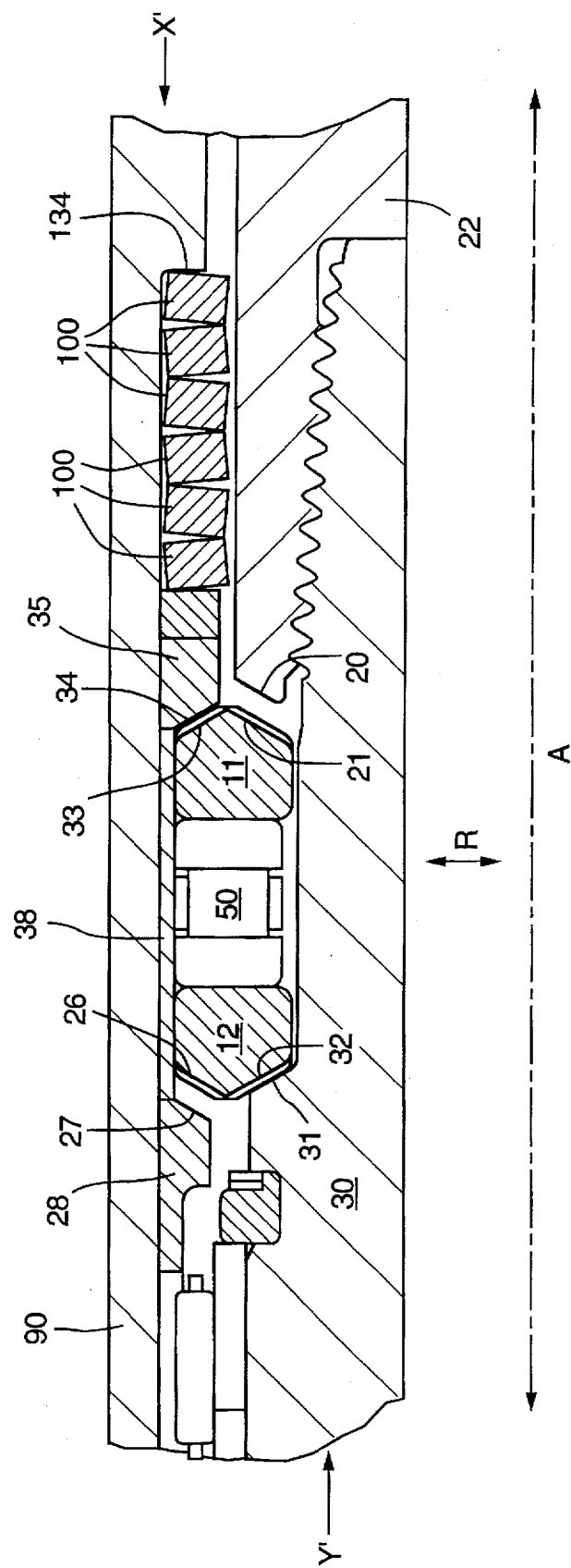
FIG. 3 is a side cross-sectional view of the FIG. 2 apparatus, in a configuration in which it bears a compressive axial load (equivalent to force X' in the downhole direction on member 90 and force Y' in the uphole direction on mandrel 30).

The bearing assembly of FIG. 1 accommodates three types of loads: radial loads exerted (in the direction of axis R shown in FIGS. 1 and 2) between the bearing section's inner rotating portion (which comprises members 22 and 30) and outer non-rotating (stationary) portion (members 90 and 28); tensile axial loads (equivalent to force X in the uphole direction on member 90 and force Y in the downhole direction on washpipe member 22) which occur, for example, when the tool is off the bottom of the well but the inner rotating section moves downhole toward the bottom of the well; and compressive axial loads (equivalent to force X' in the downhole direction on member 90 and force Y' in the uphole direction on mandrel 30 as shown in FIG. 3) occurring when the drill bit rests on the bottom of the well and is caused to rotate by the bearing section's inner rotating portion (including members 22 and 30).

As shown in FIG. 1 (and better shown in FIG. 2 or 3), the preferred embodiment of the inventive bearing assembly includes a thrust bearing 50 disposed in a chamber defined by shoulders 31 and 20 on an inner tubular member (comprising mandrel 30 and washpipe member 22) and shoulders 27 and 34 of members attached to outer tubular member 90. Mandrel 30 and washpipe member 22 are fixedly attached together by screwing a threaded end portion of mandrel 30 into a threaded end portion of washpipe member 22, and are free to rotate (about longitudinal tool axis A) relative to stationary tubular member 90. One end surface of ring 35 (the left end surface in FIG. 2) comprises shoulder 34 and portion 34A. One end surface of ring 28 (the right end surface in FIG. 2) comprises shoulder 27 and portion 27A. Portion 34A is profiled to match one end surface of element 38 (to be discussed below) and portion 27A is profiled to match the other end surface of element 38.

To assemble the apparatus, ring 11, bearing 50, and ring 12 are placed against mandrel 30, with surface 32 of ring 12 facing shoulder 31 of mandrel 30. Then, the threaded end portion of member 22 is threaded into mandrel 30, so that shoulder 20 of member 22 approaches surface 21 of ring 11. Then, ring 28 is positioned with shoulder 27 facing surface 26 of ring 12, so that when member 90 is positioned (slid) over all other elements of FIG. 2 (or FIG. 3), ring 28 is loaded against member 90 by cylinder 38, ring 35 and springs 100 (to be discussed below) and member 90 and ring 28 function together as a single stationary member. Cylindrical element 38 is then positioned against surface 27A of ring 28, and ring 35 is mounted adjacent to cylinder 38 with shoulder 34 facing surface 33 or ring 11, so that when member 90 is positioned (slid) over all other elements of FIG. 2 and ring 35 is loaded against cylinder 38 by springs 100 (as discussed below), ring 35 is not free to rotate relative to member 90 (about axis A). Springs 100 are then positioned against ring 35. Member 90 is then slid (from right to left in FIG. 2) over springs 100, ring 35, cylinder 38, ring 27 and beyond ring 27 until springs 100 are compressed between shoulder 134 of member 90 and ring 35, so as to preload ring 35 against cylinder 38 and thus against shoulder 27 (not against ring 11). When member 90 has been so positioned, the inner cylindrical surface of member 90 (the lower surface of member 90 as shown in FIG. 2) faces the outer cylindrical surfaces of rings 28 and 35 and cylinder 38, and rings 11 and 12 and bearing 50 are enclosed in the volume surrounded by cylinder 38, ring 35, ring 28, shoulder 20 of member 22, and shoulder 31 of mandrel 30.

With the device so assembled, bearing 50 and rings 11 and 12 are disposed within a chamber defined by shoulder 34 of ring 35, shoulder 20 of member 22, shoulder 27 of ring 28, and shoulder 31 of mandrel 30 (and cylinder 38 and the surface of mandrel 30 that is opposite and generally parallel to cylinder 38). Faces 26 and 32 of ring 12 face shoulders 27 and 31 respectively, and faces 33 and 21 of ring 11 face shoulders 34 and 20 respectively. Members 22 and 30 have limited freedom to slide (together as a unit) axially relative to member 90 (in addition to having freedom to rotate relative to member 90), and the overall length of bearing 50 and rings 11 and 12 (parallel to axis A) is less than the axial length of the chamber. Thus, members 22 and 30 can slide (together as a unit) axially relative to member 90 between the position shown in FIG. 2 and the position shown in FIG. 3.

Figure 4:
FIG. 4 is a perspective view of a preferred embodiment of ring 12 of the FIG. 1 apparatus.

Ring 12 has a flat end face 15 which abuts bearing 50, and end surfaces 26 and 32 (oriented at an acute angle with respect to each other) opposite end face 15. Ring 11 has a flat end face 14 which abuts bearing 50, and angled end surfaces 21 and 33 (oriented at an acute angle with respect to each other) opposite end face 14. Rings 11 and 12 preferably have identical shape, and one faces toward the left and the other faces toward the right when positioned against bearing 50 as shown in FIG. 1. FIG. 4 is a perspective view of ring 12 which shows that flat surface 15 is annular, that each of surfaces 26 and 32 has the shape of part of the surface of a solid cone (i.e., a section between two parallel circles on the surface of the solid cone), and that surfaces 26 and 32 meet at a circular ridge 13.

In alternative embodiments, side members other than above-described rings 11 and 12 are positioned on opposite ends of thrust bearing 50. The shape of each side member can differ from that of above-described ring 12 (or 11)

preferred embodiment, provided that: each side member has a flat end face (for abutting the thrust bearing) and an angled end surface (opposite the flat end face); a central portion of each angled end surface is an extreme distance away from the flat end face (it is either the part of the angled end surface nearest to or farthest from the flat end face); and each angled end surface has two outer surface portions, which meet each other at an acute or obtuse angle (the central portion typically has a very small surface area, and typically is shaped substantially as a point, or a curve such as a circle). Each outer surface portion of each angled end surface faces a shoulder of the chamber in which the bearing subassembly is disposed, and has a profile which matches that of the shoulder which it faces. Each outer surface portion has rotational symmetry about the central longitudinal axis (when the side member is installed in the chamber), each can have uniform or nonuniform curvature, and typically, each is smooth in the sense that its curvature varies slowly from place to place. By using side members having angled end surfaces as described, each shoulder efficiently bears against one outer surface portion in either a tensile or compressive load configuration, but is held off that outer surface portion in the other one of the tensile and compressive load configurations, and the entire bearing subassembly is centered transversely in the chamber (in the sense that there is no more than insignificant friction between either side member and the portion of the chamber wall between the shoulders of the first member or the portion of the chamber wall between the shoulders of the second member).

In preferred embodiments, the central portion of each side member is the portion of the angled end surface farthest from the flat end face, and the two outer surface portions meet at an acute angle at the central portion (such a side member is sometimes denoted herein as a "protruding" side member). In the preferred embodiments, each longitudinal end of the chamber is defined by shoulders which meet at an obtuse angle (each shoulder having a profile which matches that of the outer surface portion facing it).

In alternative embodiments, the central portion of at least one side member is the portion of the angled end surface nearest to the flat end face, and the two outer surface portions meet at an obtuse angle at the central portion (such a side member is sometimes denoted herein as an "indented" side member). In these embodiments, each longitudinal end of the chamber which faces an indented side member is defined by shoulders which meet at an acute angle (each shoulder having a profile which matches that of the outer surface portion facing it).

Figure 5:
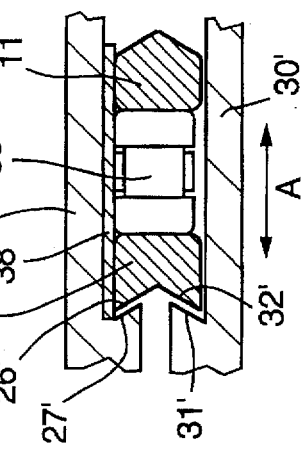
FIG. 5 is a side cross-sectional view of a portion of an alternative embodiment of the inventive apparatus, in a configuration in which it bears a tensile axial load.

A portion of an alternative embodiment of the type described in the previous paragraph is shown in FIG. 5. The thrust bearing subassembly of FIG. 5 comprises ring 11 and bearing 50 (identical to the identically numbered components of FIGS. 1–3), and an indented ring 12' (replacing protruding ring 12 of FIGS. 1–3). The central portion of the angled surface of ring 12' (the left surface in FIG. 5) is a circular ridge, and faces 26' and 32' meet at an obtuse angle at this central portion (in contrast with faces 26 and 32 of ring 12 which meet at an acute angle at the central, circular ridge, portion of ring 12). The thrust bearing subassembly of FIG. 5 is disposed in a chamber between member 90' and member 30' (one of members 90' and 30' is free to rotate about axis A relative to the other of members 90' and 30'). Cylinder 38 (identical to that of FIGS. 2–3) is positioned between the thrust bearing subassembly and a cylindrical inner wall of member 90'. In a tensile load configuration (in which the thrust bearing subassembly of FIG. 5 bears a tensile axial load), shoulder 27' of member 90' bears against face 26' of ring 12' (while the central portions of rings 11 and 12' at least substantially center the bearing subassembly transversely in the chamber). In a compressive load configuration (not shown) in which the thrust bearing subassembly of FIG. 5 bears a compressive axial load), shoulder 31' of member 30' bears against face 32' of ring 12' (while the central portions of rings 11 and 12' at least substantially center the bearing subassembly transversely in the chamber).

In each embodiment, the invention includes a first member having a central longitudinal axis; a second member having a second central longitudinal axis that coincides with the central longitudinal axis, the second member having freedom to rotate about the central longitudinal axis relative to the first member and at least limited freedom to translate axially (along the central longitudinal axis) relative to the first member; and a thrust bearing subassembly within a chamber between the first member and the second member (the chamber being defined by two shoulders of the first member and two shoulders of the second member). The thrust bearing subassembly has side members, each having an angled end surface, and each angled end surface has a central portion and two outer portions. Each of the outer portions faces one shoulder of the chamber, and each shoulder has a profile which matches that of the outer portion facing it, so that: each shoulder efficiently bears against the angled end surface portion (which faces it) in either the tensile or compressive load-bearing configuration; each shoulder is held off the angled end surface portion (which faces it) in the other one of the tensile or compressive load-bearing configurations; and the thrust bearing subassembly is centered (transversely) in the chamber in both the tensile and compressive load-bearing configurations (so that there is no more than insignificant friction between either side member and the portion of the chamber wall between the shoulders of the first member or the portion of the chamber wall between the shoulders of the second member).

In one embodiment of the invention, each side member has a flat end face which is a solid disk (having a circular periphery) and an angled end surface which is conical, and thus has two half-conical surface portions which meet at an acute angle at the cone's apex point (the apex point is the central portion of the angled end surface). When using this embodiment of the inventive side member, shoulders identical to above-described shoulders 20, 27, 31, and 34 (of FIGS. 1–3) are preferably used, and several pairs of the side members are preferably disposed around the ring-shaped chamber of FIGS. 1 and 2 with the side members in each pair positioned abutting opposite ends of a thrust bearing in the chamber. In a variation on the latter embodiment, multiple thrust bearings (each having a generally cylindrical shape, unlike above-described ring-shaped bearing 50) are disposed around the chamber, with one side member positioned at each end of each thrust bearing.

In another embodiment, each side member is generally cylindrical with an annular flat end face identical to face 15 of FIG. 4, and an angled end surface consisting of two portions with smoothly varying curvature (neither of the portions is a section of the surface of a cone) meeting at an acute angle at a circular ridge identical to ridge 13 of FIG. 4. In this alternative embodiment, the shape of shoulders 20, 27, 31 and 34 would be modified to match the shape of each of the curved portions of the angled end surface of each side member.

Thrust bearing 50 can have conventional design, such as the conventional thrust bearing design comprising rollers in a ring-shaped cage. Preferably, bearing 50 is designed so that there is no more than low friction tending to impede rotation of surface 15 of ring 12 against bearing 50, and so that there is no more than low friction tending to impede rotation of surface 14 of ring 11 against bearing 50.

In the embodiment of FIGS. 1–3, shoulder 20 is angled to be substantially parallel to face 21 of ring 11, shoulder 31 is angled to be substantially parallel to face 32 of ring 12, shoulder 34 is angled to be substantially parallel to face 33 of ring 11, and shoulder 27 is angled to be substantially parallel to face 26 of ring 12. Shoulders 27 and 34 are not parallel to each other, shoulder 31 is generally parallel to shoulder 34, shoulder 20 is generally parallel to shoulder 27, and shoulders 20 and 31 are not parallel to each other. Although shoulder 31 is generally parallel to shoulder 34 in FIGS. 1–3, it need not be in alternative embodiments. Similarly, although shoulder 20 is generally parallel to shoulder 27 in FIGS. 1–3, it need not be in alternative embodiments.

FIG. 2 shows a portion of the inventive bearing assembly when placed under a tensile axial load (equivalent to force X in the uphole direction on member 90 and force Y in the downhole direction on washpipe member 22, as shown in FIG. 2). When the assembly bears such a tensile axial load, shoulder 27 of ring 28 (which is associated with member 90, since ring 28 does not move relative to member 90) bears against surface 26 of ring 12, and thus ring 12 bears against the left end surface of bearing 50, and shoulder 20 of member 22 bears against surface 21 of ring 11, and thus ring 11 bears against the right end surface of bearing 50. Thus, bearing 50 bears the axial load.

FIG. 3 shows the same portion of the inventive bearing assembly as shown in FIG. 2, when it is placed under a compressive axial load (equivalent to force X' in the downhole direction on member 90 and force Y' in the uphole direction on mandrel 30 as shown in FIG. 3). When the assembly bears such a compressive axial load, shoulder 34 of ring 35 bears against surface 33 of ring 11, and thus ring 11 bears against the right end surface of bearing 50, and shoulder 31 of member 30 bears against surface 32 of ring 12, and thus ring 12 bears against the left end surface of bearing 50. Thus, bearing 50 bears the axial load. Ring 35 has limited freedom to slide axially (to the right in FIG. 3) away from cylinder 38, but is biased by springs 100 to move axially to the left until it rests against cylinder 38.

All of shoulders 20, 27, 31, and 34 are angled (at an acute angle to a plane perpendicular to longitudinal tool axis A), all of faces 21 and 33 of ring 11 and faces 26 and 32 of ring 12 are angled (at an acute angle to a plane perpendicular to longitudinal tool axis A), and the combined axial length of the subassembly comprising bearing 50 and rings 11 and 12 (sometimes referred to hereinafter as the "chamber subassembly") is sufficiently short that this "chamber subassembly" does not prevent limited axial motion of member 90 relative to members 22 and 30. For these reasons, each of rings 11 and 12 is always held off each surface of members 22, 28, 30, and 35 that rotates relative thereto during operation of the FIG. 1 assembly (including at times when member 90 rotates relative to members 20 and 33 under tensile axial loading or under compressive axial loading). We next explain the previous sentence in detail.

When the bearing assembly of FIG. 1 is placed under tension (when running off the bottom of a well), member 22 and ring 11 rotate together as a unit about tool axis A relative to stationary members 90 and 28 (including shoulder 27) and relative to ring 12 which also remains stationary with members 28 and 90. Due to the angled surfaces 21, 33, 26, and 32 of rings 11 and 12 (and the overall length of the chamber subassembly), shoulder 34 is held off surface 33 of rotating ring 11 in this case, and shoulder 31 is held off surface 32 of stationary ring 12. The forces exerted between shoulder 20 and face 21 and between shoulder 27 and face 26 tend to center the chamber subassembly transversely in the chamber, so that there is no more than insignificant friction between side member 11 and cylinder 38 (or between side member 12 and the inner surface of member 30 between shoulders 31 and 20), and thus no significant heat build up at any of the surfaces of ring 11 or ring 12.

Similarly, when the bearing assembly is placed under compression (when running on the well bottom), member 30 and ring 12 rotate together as a unit about longitudinal axis A relative to stationary member 90 (including shoulder 35) and ring 11 which also remains stationary. Due to the angled surfaces 21, 33, 26, and 32 of rings 11 and 12 (and the overall length of the chamber subassembly), shoulder 20 is held off surface 21 of stationary ring 11 in this case, and shoulder 27 is held off surface 26 of rotating ring 12. The forces exerted between shoulder 34 and face 33 and between shoulder 31 and face 32 tend to center the chamber subassembly transversely in the chamber, so that there is no more than insignificant friction between side member 12 and cylinder 38 (or between side member 11 and the inner surface of member 30 between shoulders 31 and 20), and thus no significant heat build up at any of the surfaces of ring 11 or ring 12.

Neither ring 11 nor ring 12 is fixedly attached to any of members 22, 30, 90, 28, or 38. Thus, each of rings 11 and 12 can have a simple design (e.g., without the need to have grooves or lands which lock it to any of members 22, 30, 90, 28, and 38).

Face 34 of ring 35 is free to move axially (along axis A) toward or away from ring 28 in response to compression or relaxation of springs 100, which are positioned between ring 35 and shoulder 134 of member 90. Springs 100 do not function to maintain a preload on thrust bearing 50, ring 11, or ring 12. Springs 100 exert no force at all on bearing 50, ring 11, or ring 12 in the "off bottom" mode (when tensile force tends to separate outer tubular member 90 from inner tubular member 22,30 into the configuration shown in FIG. 2). In the "on bottom" mode (when compressive force tends to telescope the inner member further within the outer tubular member into the configuration shown in FIG. 3), springs 100 function to absorb shocks and vibrational energy that would otherwise be absorbed by bearing 50 and rings 11 and 12 due to compressive axial forces exerted thereon by rightward impact of shoulder 31 of mandrel 30 against ring 12 and by leftward impact against ring 11 of the assembly comprising member 90 (i.e., shoulder 134 of member 90) and ring 35.

The function of bearing assembly 60 shown in FIG. 1 is to bear radial loads exerted (in the direction of axis R shown in FIGS. 1 and 2) between the inner rotating portion (in particular, mandrel 30 thereof) and outer non-rotating portion (member 90) of the FIG. 1 apparatus. Bearing assembly 60 can have conventional design.

The foregoing is merely illustrative and explanatory of preferred embodiments of the inventive apparatus. Various changes in the component sizes and shapes, and other details of the embodiments described herein may be within the scope of the appended claims.

What is claimed is:

1. A bearing assembly for bearing tensile and compressive axial loads, including:

a first member having a central longitudinal axis and a surface defining a first shoulder and a second shoulder;

a second member, having a second central longitudinal axis coinciding with the central longitudinal axis, positioned relative to the first member with freedom to rotate about the central longitudinal axis relative to the first member and at least limited freedom to translate relative to the first member along the central longitudinal axis, the second member having a surface defining a third shoulder and a fourth shoulder; and a thrust bearing subassembly in a chamber between the first member and the second member, said chamber being bounded by the first shoulder, the second shoulder, the third shoulder, and the fourth shoulder, wherein the thrust bearing subassembly has an overall axial length sufficiently short so that the second member is free to translate along the central longitudinal axis relative to the first member between a tensile load configuration in which the thrust bearing subassembly bears a tensile axial load and a compressive load configuration in which the thrust bearing subassembly bears a compressive axial load, wherein the thrust bearing subassembly includes:

a pair of side members; and a thrust bearing between the side members, where each of the side members has a flat end face abutting the thrust bearing and an angled end surface opposite the flat end face, wherein each said angled end surface has a central portion and two outer portions which meet at an angle at the central portion.

2. The assembly of claim 1, wherein the central portion of each angled end surface is the portion of said angled end surface farthest from the flat end face, and the outer portions meet at an acute angle at the central portion.

3. The assembly of claim 1, wherein the central portion of at least one said angled end surface is the portion of said at least one said angled end surface nearest to the flat end face, and the outer portions meet at an obtuse angle at the central portion.

4. The assembly of claim 1, wherein each of the surface portions faces a different one of the first shoulder, the second shoulder, the third shoulder, and the fourth shoulder, and wherein the first shoulder bears against a first one of the surface portions of a first one of the side members and the third shoulder bears against a first one of the surface portions of a second one of the side members in the tensile load configuration, and the first shoulder does not bear against the first one of the surface portions of the first one of the side members and the third shoulder does not bear against the first one of the surface portions of the second one of the side members in the compressive load configuration.

5. The assembly of claim 4, wherein the first one of the surface portions of the first one of the side members has a profile which matches a shoulder profile of the first shoulder, and the first one of the surface portions of the second one of the side members has a profile which matches a shoulder profile of the third shoulder.

6. The assembly of claim 4, wherein the second shoulder bears against a second one of the surface portions of the second one of the side members and the fourth shoulder bears against a second one of the surface portions of the first one of the side members in the compressive load configuration, and wherein the first member also includes:

a spring assembly for preloading the first shoulder against the second shoulder.

7. The assembly of claim 1, wherein the chamber is a generally annular volume, the side members are rings and the thrust bearing is generally ring-shaped.

8. The assembly of claim 7, wherein the central portion of the angled end surface of each of the rings is a circular ridge.

9. The assembly of claim 1, wherein the first member, the second member, and the thrust bearing subassembly have sufficient strength for use in a drilling tool in a downhole environment.

10. The assembly of claim 1, wherein each of the surface portions faces a different one of the first shoulder, the second shoulder, the third shoulder, and the fourth shoulder, wherein the first shoulder bears against a first one of the surface portions of a first one of the side members and the third shoulder bears against a first one of the surface portions of a second one of the side members in the tensile load configuration, and the first shoulder does not bear against the first one of the surface portions of the first one of the side members and the third shoulder does not bear against the first one of the surface portions of the second one of the side members in the compressive load configuration, and wherein the second shoulder bears against a second one of the surface portions of the second one of the side members and the fourth shoulder bears against a second one of the surface portions of the first one of the side members in the compressive load configuration, and wherein the first member includes:

a tubular member having a fifth shoulder;

a first ring member fixedly attached to the tubular member, wherein the second shoulder is a surface of the first ring member;

a second ring member attached to the tubular member with freedom to slide axially relative to the tubular member, wherein the first shoulder is a surface of the second ring member;

a cylindrical member positioned between the first ring member and the second ring member; and a spring assembly positioned between the first ring member and the fifth shoulder for preloading the second ring member against the cylindrical member, thereby preloading the cylindrical member against the first ring member.

11. The assembly of claim 10, wherein the spring assembly exerts no force on the thrust bearing subassembly in the tensile load configuration, and said spring assembly absorb shocks and vibrational energy that would otherwise be absorbed by the thrust bearing subassembly when the assembly is in the compressive load configuration.

12. A bearing assembly for bearing tensile and compressive axial loads, including:

an outer tubular member having a central longitudinal axis and an inner surface defining a first shoulder and a second shoulder;

an inner tubular member, having a second central longitudinal axis coinciding with the central longitudinal axis, positioned relative to the outer tubular member with freedom to rotate about the central longitudinal axis relative to the outer tubular member and at least limited freedom to translate relative to the outer tubular member along the central longitudinal axis, the inner tubular member having an outer surface defining a third shoulder and a fourth shoulder; and a thrust bearing subassembly in a chamber between the inner tubular member and the outer tubular member, said chamber being bounded by the first shoulder, the second shoulder, the third shoulder, and the fourth shoulder, wherein the thrust bearing subassembly has an overall axial length sufficiently short so that the inner tubular member is free to translate along the central longitudinal axis relative to the outer tubular member between a tensile load configuration in which the thrust bearing subassembly bears a tensile axial load and a compressive load configuration in which the thrust bearing subassembly bears a compressive axial load, wherein the thrust bearing subassembly includes:

a pair of side members; and a thrust bearing between the side members, where each of the side members has a flat end face abutting the thrust bearing and an angled end surface opposite the flat end face, wherein each said angled end surface has a central portion farthest from the flat end face, and two surface portions which meet at an acute angle at the central portion.

13. The assembly of claim 12, wherein the chamber is a generally annular volume, the side members are rings and the thrust bearing is generally ring-shaped.

14. The assembly of claim 13, wherein the central portion of the angled end surface of each of the rings is a circular ridge.

15. The assembly of claim 13, wherein each of the surface portions of each said angled end surface faces a different one of the first shoulder, the second shoulder, the third shoulder, and the fourth shoulder, wherein the first shoulder bears against a first one of the surface portions of a first one of the side members and the third shoulder bears against a first one of the surface portions of a second one of the side members in the tensile load configuration, and the first shoulder does not bear against the first one of the surface portions of the first one of the side members and the third shoulder does not bear against the first one of the surface portions of the second one of the side members in the compressive load configuration, and wherein the second shoulder bears against a second one of the surface portions of the second one of the side members and the fourth shoulder bears against a second one of the surface portions of the first one of the side members in the compressive load configuration.

16. The assembly of claim 15, wherein the outer tubular member includes:

a shaft having a surface defining a fifth shoulder;

a first ring member fixedly attached to the shaft, wherein the second shoulder is a surface of the first ring member;

a second ring member attached to the shaft with freedom to slide axially relative to the shaft, wherein the first shoulder is a surface of the second ring member;

a cylindrical member positioned against the shaft between the first ring member and the second ring member; and a spring assembly positioned between the first ring member and the fifth shoulder for preloading the second ring member against the cylindrical member, thereby preloading the cylindrical member against the first ring member.

17. The assembly of claim 16, wherein the spring assembly exerts no force on the thrust bearing subassembly in the tensile load configuration, and the spring assembly absorb shocks and vibrational energy that would otherwise be absorbed by the thrust bearing subassembly when the assembly is in the compressive load configuration.

* * * * *